US00RE40318E

(19) United States
(12) Reissued Patent
Yoneda

(10) Patent Number: US RE40,318 E
(45) **Date of Reissued Patent: *May 20, 2008**

(54) HEADPHONE

(75) Inventor: Naofumi Yoneda, Tokyo (JP)

(73) Assignee: Sony Corporation, Tokyo (JP)

( * ) Notice: This patent is subject to a terminal disclaimer.

(21) Appl. No.: 29/209,535

(22) Filed: May 21, 2004

Related U.S. Patent Documents

Reissue of:
(64) Patent No.: Des. 457,512
Issued: May 21, 2002
Appl. No.: 29/144,207
Filed: Jun. 29, 2001

(51) LOC (8) Cl. ..... 14-01
(52) U.S. Cl. ..... D14/205
(58) Field of Classification Search ..... D14/192, D14/205–206, 223; 181/129–130; 379/430–431; 381/370–371, 374, 376, 378–381; 455/575.2
See application file for complete search history.

(56) References Cited

U.S. PATENT DOCUMENTS

| | | | | |
|---|---|---|---|---|
| D358,390 S | | 5/1995 | Hayashi | |
| D373,360 S | | 9/1996 | Kanno | |
| D391,573 S | | 3/1998 | Nakamura | |
| D409,197 S | | 5/1999 | Nakamura | |
| D410,466 S | | 6/1999 | Mouri | |
| 5,987,147 A | | 11/1999 | Nishimoto | |
| 6,006,115 A | | 12/1999 | Wingate | |
| D420,356 S | | 2/2000 | Suzuki | |
| D422,592 S | | 4/2000 | Deguchi | |
| D435,249 S | | 12/2000 | Yasutomi | |
| D457,874 S | * | 5/2002 | Yoneda | D14/205 |
| D476,639 S | * | 7/2003 | Bergeron et al. | D14/205 |

FOREIGN PATENT DOCUMENTS

| | | |
|---|---|---|
| GB | 2094608 | 8/2000 |
| WO | DM/052964 S | 7/2000 |

OTHER PUBLICATIONS

Catalog "Headphone/Active Speark System," pp. 13 & 14 & 19, Sony Corporation, Jul. 2000.

* cited by examiner

*Primary Examiner*—Nanda Bondade
(74) *Attorney, Agent, or Firm*—Rader, Fishman & Grauer, PLLC

(57) CLAIM

The ornamental design for a headphone, as shown and described.

DESCRIPTION

FIG. 1 is a perspective view of a headphone showing my new design;
FIG. 2 is a front elevational view thereof;
FIG. 3 is a rear elevational view thereof;
FIG. 4 is a left side elevational view thereof;
FIG. 5 is a right side elevational view thereof;
FIG. 6 is a top plan view thereof; and,
FIG. 7 is a bottom plan view thereof.
*The broken line showing in the drawing disclosure is for illustrative purposes only and forms no part of the claimed design.*

1 Claim, 4 Drawing Sheets

Matter enclosed in heavy brackets [ ] appears in the original patent, but forms no part of this reissue; matter printed in italics indicates the additions made by reissue.

Amended

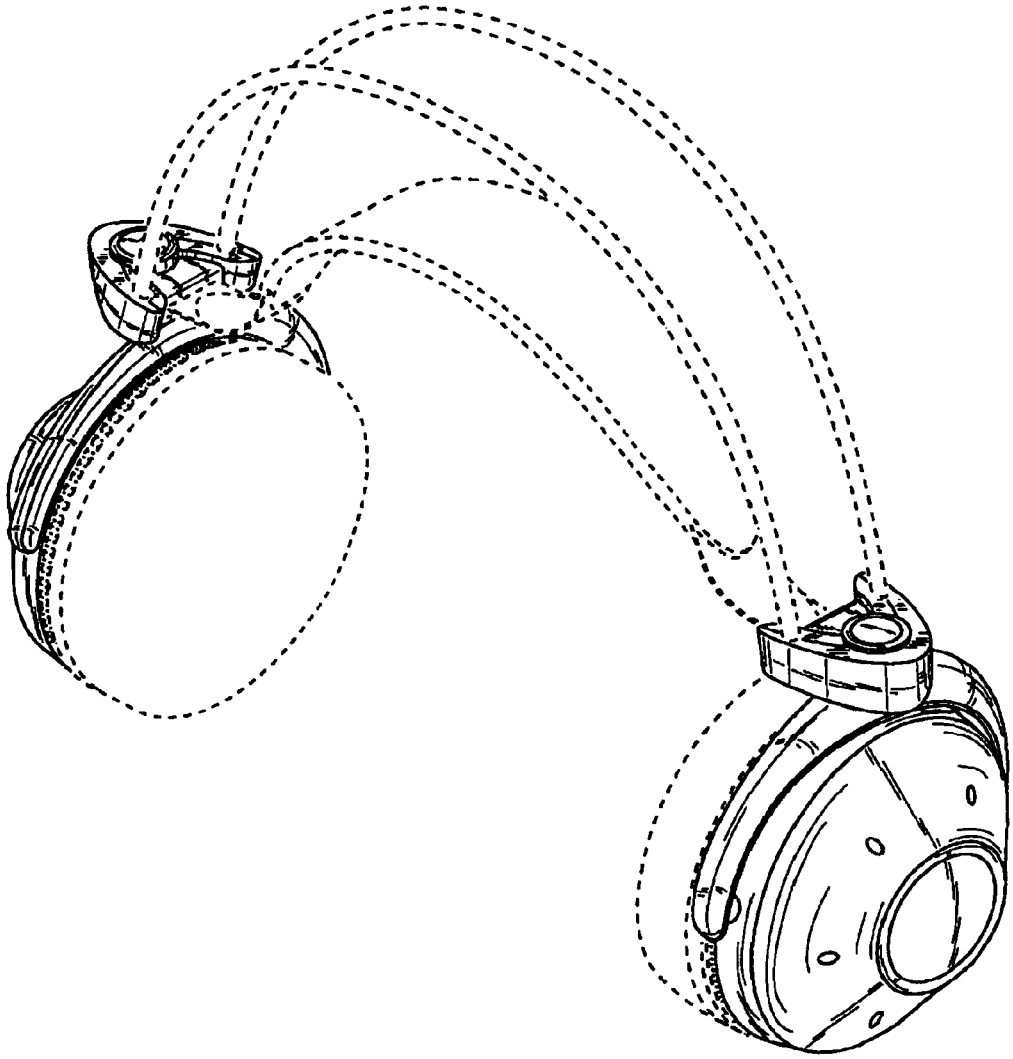
Fig. 1 Amended

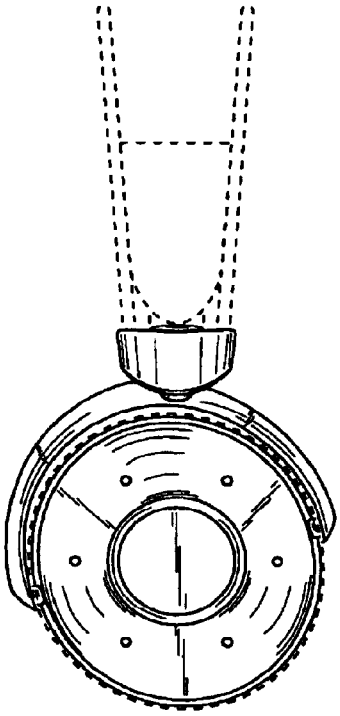
Fig. 2 Amended
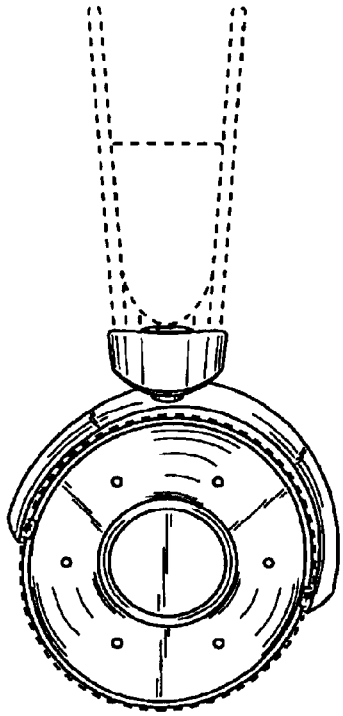
Fig. 3 Amended

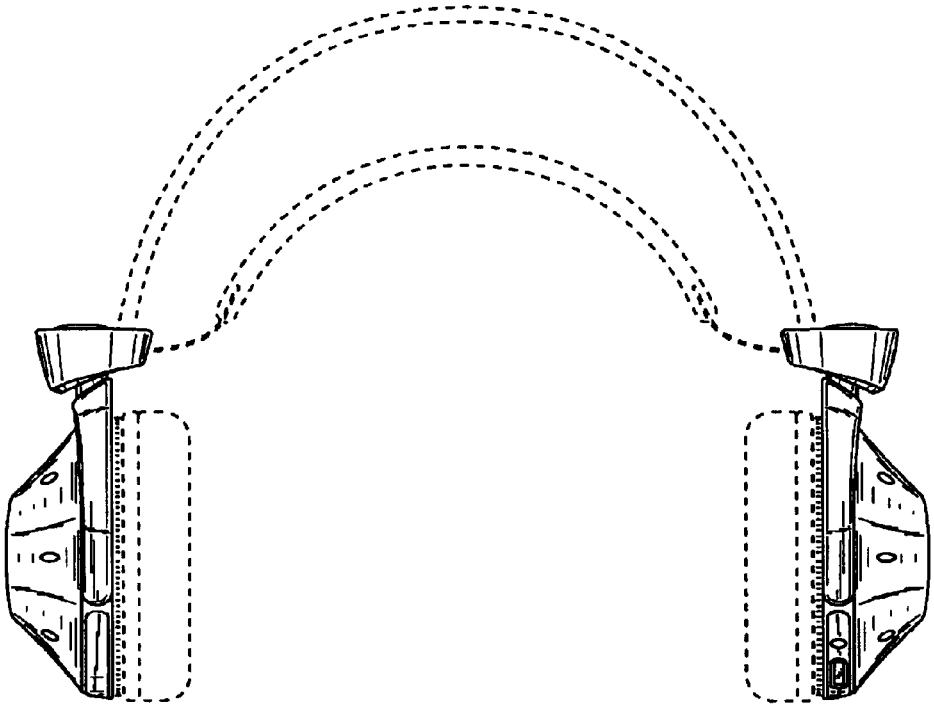
Fig. 4 Amended
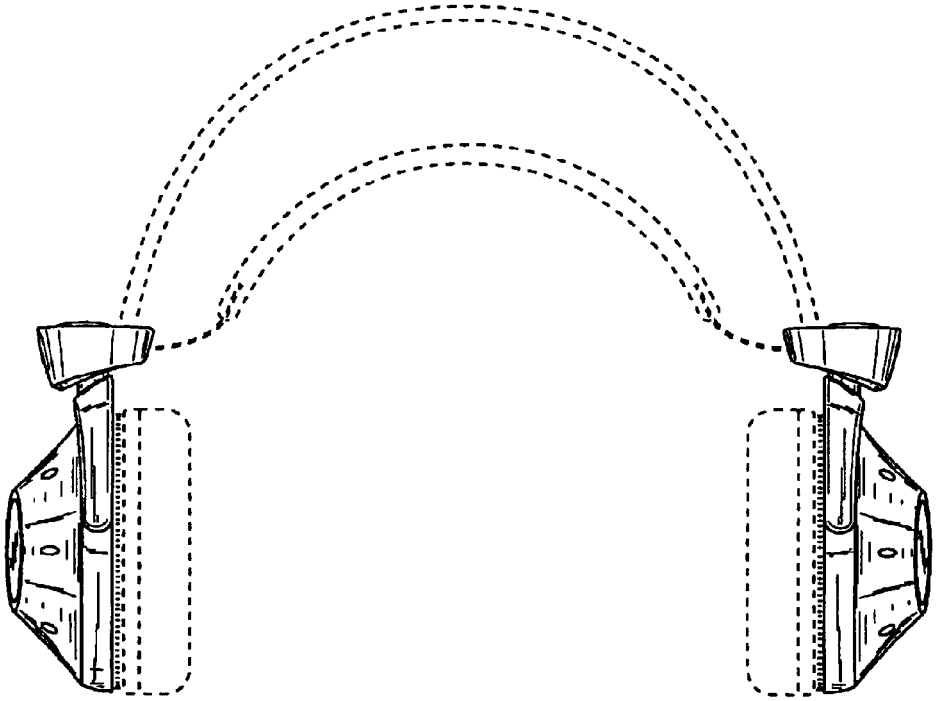
Fig. 5 Amended

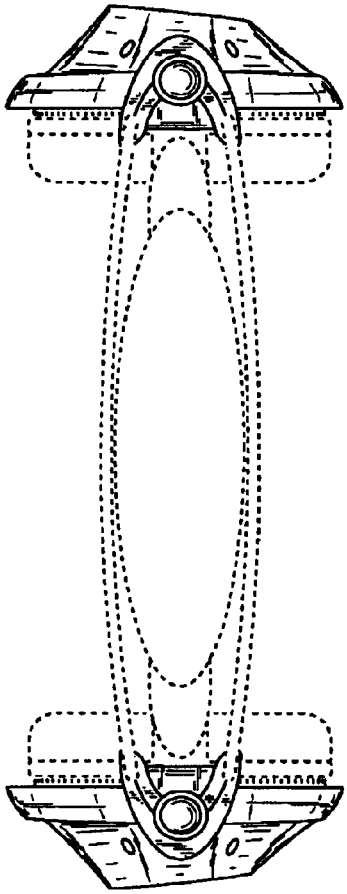
Fig. 6 Amended
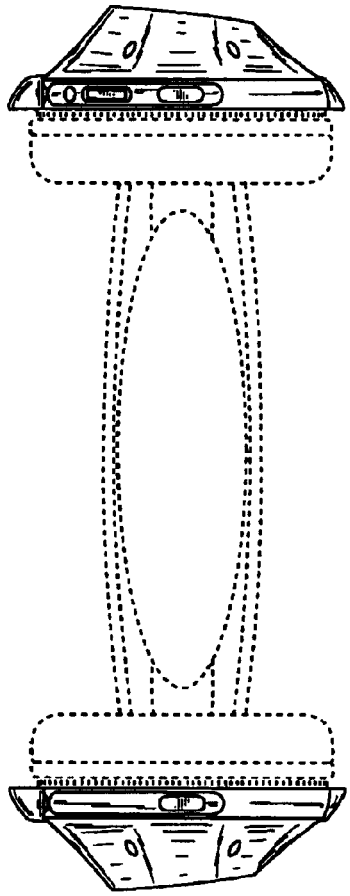
Fig. 7 Amended